(12) United States Patent
Cunningham

(10) Patent No.: US 6,532,676 B2
(45) Date of Patent: Mar. 18, 2003

(54) LASER LEVELER

(76) Inventor: Christopher L. Cunningham, 307 Beechcroft Rd., Winchester, Frederick County, VA (US) 22601

( * ) Notice: Subject to any disclaimer, the term of this patent is extended or adjusted under 35 U.S.C. 154(b) by 0 days.

(21) Appl. No.: 09/800,517

(22) Filed: Mar. 8, 2001

(65) Prior Publication Data

US 2001/0034944 A1 Nov. 1, 2001

Related U.S. Application Data

(60) Provisional application No. 60/188,029, filed on Mar. 9, 2000.

(51) Int. Cl.[7] .............................................. G01C 15/00
(52) U.S. Cl. ........................ 33/286; 33/DIG. 21; 33/371
(58) Field of Search .............................. 33/227, 275 R, 33/286, 347, 370, 371, DIG. 1, DIG. 21

(56) References Cited

U.S. PATENT DOCUMENTS

| | | | | | |
|---|---|---|---|---|---|
| 2,517,295 | A | * | 8/1950 | Esher | 33/275 R |
| 2,695,949 | A | * | 11/1954 | Ashwill | 33/347 |
| 3,772,797 | A | * | 11/1973 | Gleba | 33/227 |
| 3,909,952 | A | * | 10/1975 | Lagasse | 33/286 |
| 5,012,585 | A | * | 5/1991 | DiMaggio | 33/227 |
| 5,131,161 | A | * | 7/1992 | Drag | 33/DIG. 1 |
| 5,167,075 | A | * | 12/1992 | Weldy et al. | 33/371 |
| 5,561,911 | A | * | 10/1996 | Martin | 33/DIG. 21 |
| 5,568,265 | A | * | 10/1996 | Matthews | 33/286 |
| 5,784,792 | A | * | 7/1998 | Smith | 33/227 |
| 5,894,675 | A | * | 4/1999 | Cericola | 33/286 |
| 6,052,911 | A | * | 4/2000 | Davis | 33/DIG. 21 |

* cited by examiner

Primary Examiner—G. Bradley Bennett
(74) Attorney, Agent, or Firm—Lacasse & Associates, LLC; Randy W. Lacasse; Jaclyn A. Schade

(57) ABSTRACT

A laser tool is designed to indicate and align measurements, preferably holes to be drilled for hangers that support plumbing and electrical piping, without the need for the use of a tape measure. The laser tool contains an angled base with magnets that allow the tool to remain steady on a pipe. Also included in the base is a bubble level, indicating and allowing the user to balance the tool in relation to the pipe. The laser of the tool is connected to the base by means of a swivel device, so that the user is capable of moving the laser at an angle to obtain additional measurements that are level and aligned with the original measurement for a hole.

13 Claims, 7 Drawing Sheets

LASER LEVELER

RELATED APPLICATIONS

The present application claims the benefit of provisional patent application "Right Spot—Lazer Leveler", Ser. No. 60/188,029, filed Mar. 9, 2000.

BACKGROUND OF THE INVENTION

1. Field of Invention

The present invention relates generally to the field of tools used during construction to insure proper alignment and leveling of materials. More specifically, the present invention is related to construction tools used in the aid of drilling and aligning holes for plumbing and electrical piping hangers.

2. Discussion of Prior Art

The use of measuring devices in the construction world is essential for providing accuracy and ease when building and hanging structures. Particularly, accurate measurement is important for maintaining straight and level objects, such as in hanging pipes with pipe hangers from a ceiling. For example, inaccurate measurements can either reduce or increase flow of a liquid, and therefore provide additional problems when the incorrect calculation of flow rates is used in standard formulas. Running pipes to fixed objects (such as transformers) located a distance from the pipes also poses challenges because of the distances and angles involved. In addition, the hangers are usually placed up high, near the ceiling, making the task difficult and inaccurate when working/measuring/drilling above the head—potentially on a ladder or scaffolding.

A further problem that may be encountered is the dependability of others. The use of a ruler, tape measure or other standard measuring device requires the help of another person, which can be a great inconvenience, because another person may not always be available to aid in making these measurements. Also, there is no guarantee for maintaining the alignment for each measurement. Tape measures extended over a long span tend to bow or bend, making measuring difficult, if not impossible. Even a fraction of an inch in the wrong direction can cause problems when hanging pipes and other objects. When hanging pipes in locations having fixed or sprayed insulation, it is important to drill hanger holes in a precise location so as not to have to reinsulated an area with incorrect hole locations. Some have "solved" this problem by loft using a leveling device along with a ruler, but this too is inconvenient and tedious.

Some prior art construction devices utilizing a laser or laser beam, have been developed to assist in some aspects of this problem. A laser device provides help in measuring major angle measurements, such as those needed for angle applications in the construction world, i.e. slopes and tilting structures (such as stairs), as well as straight measurements, such as those in a horizontal or vertical plane. A device such as this may save time and money, and provide more accurate measurements. Whatever the precise merits, features and advantages of the above cited references, none of them achieve or fulfills the purposes of the present invention.

SUMMARY OF THE INVENTION

The present laser tool is designed to indicate and align measurements, preferably holes to be drilled for hangers that support plumbing and electrical piping, without the need for the use of a tape measure. The laser tool contains an angled base with magnets that allow the tool to remain steady on any size pipe or attach to a planar metal surface. Also included in the base is a bubble level, indicating and allowing the user to balance the tool in relation to the pipe. The laser of the tool is connected to the base by means of a swivel device, so that the user is capable of moving the laser at numerous angles to obtain additional measurements that are level and aligned with the original measurement for a hole. The tool is also small enough for a person to carry in a pocket, and therefore provides more convenience than larger tools.

DESCRIPTION OF THE PREFERRED EMBODIMENTS

Figure 1:
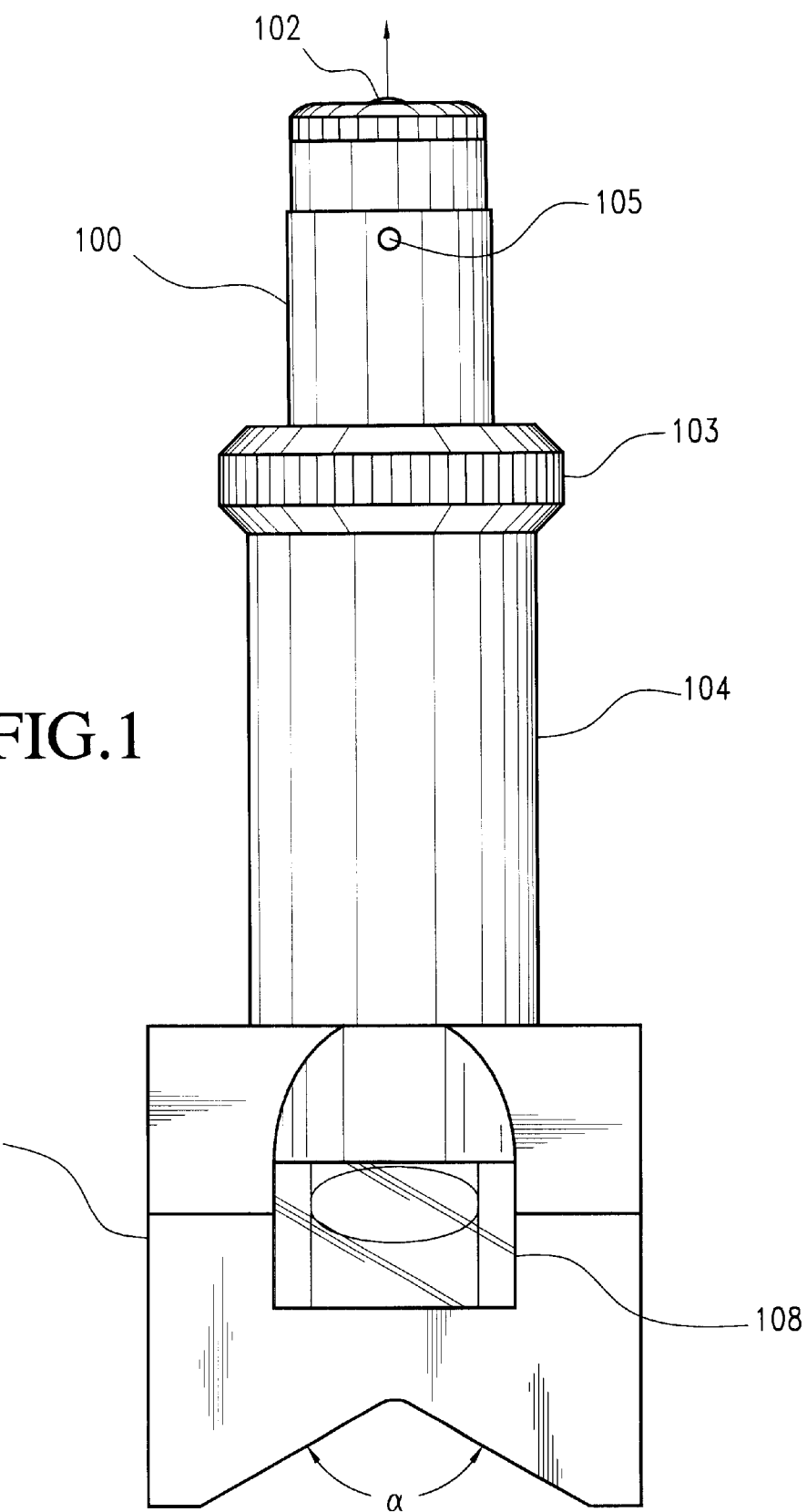
FIG. 1 illustrates a front view of the preferred embodiment of the laser tool.

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

The FIGS. 1–7 illustrate a preferred embodiment of the present invention laser leveler. FIG. 1 illustrates a frontal view of the laser tool. As can be seen, the tool consists of a laser 100 that emits a laser beam output from 102. Laser 100 is, for example a class 111a laser with a laser diode wavelength of 630–680 nm with a max. output of less than 5 mW (battery power supply). The laser is calibrated by altering alignment with one or more set screws 105 in the casing. Laser 100 is held within sleeve 104, which is connected to base 106 and is turned on and off by rotation of 104 by ribbed section 103. The inner circumference of sleeve 104 contains a ramped section (not shown) which receives the on button of the laser (not shown) and compresses it as the sleeve is rotated and vice-versa. As shown, base 106 is angled at the bottom (α—approx. 110 degrees); however, alternative angles are envisioned based on application. Both sleeve 104 and base 106 are preferably made of injection molded ABS plastic. Bubble level 108 is fit into base 106. All substantive parts connected press to base are fit without adhesives, although other known methods can be used.

Figure 2:
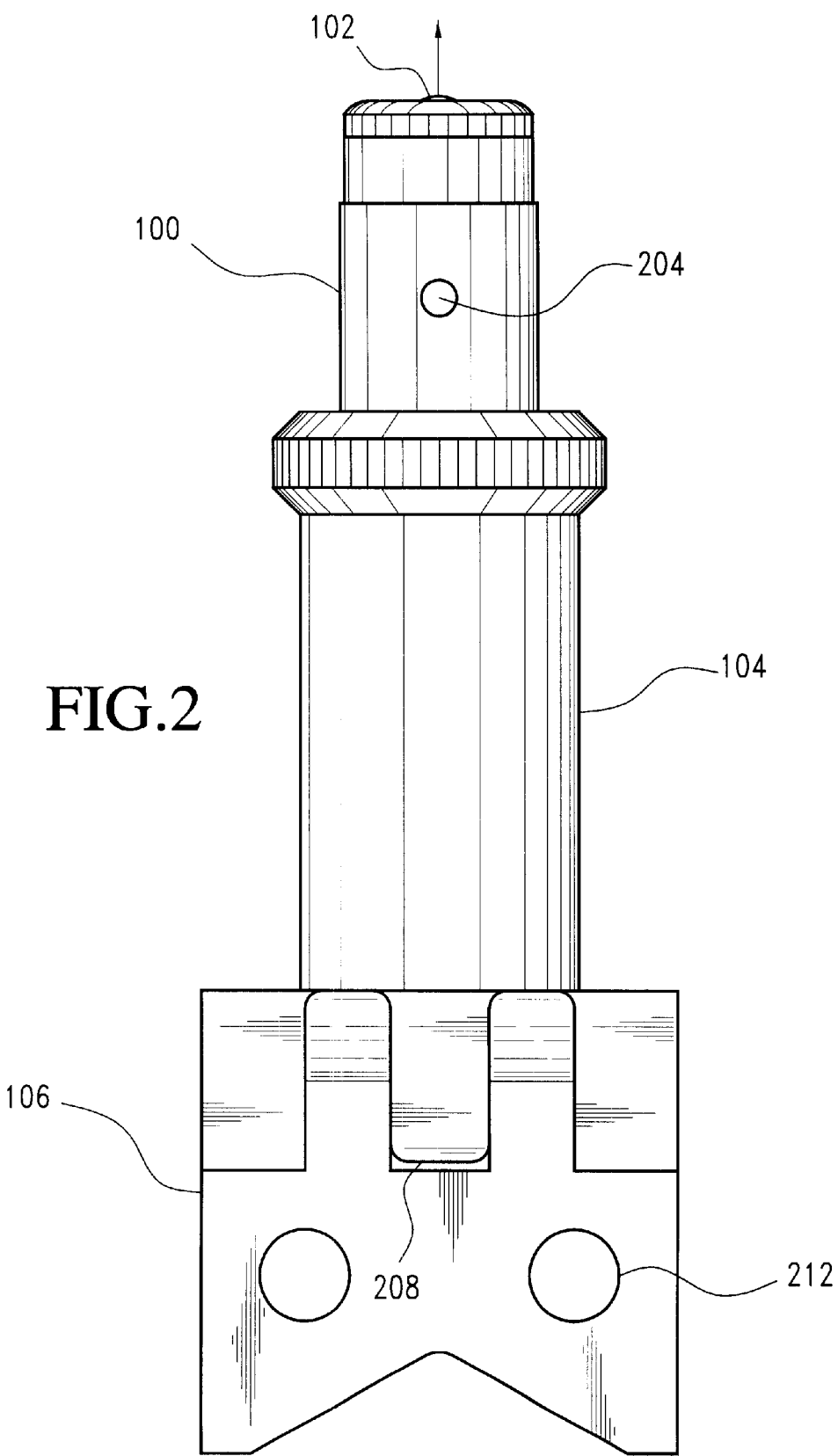
FIG. 2 illustrates a back view of the preferred embodiment of the laser tool.
Figure 3:
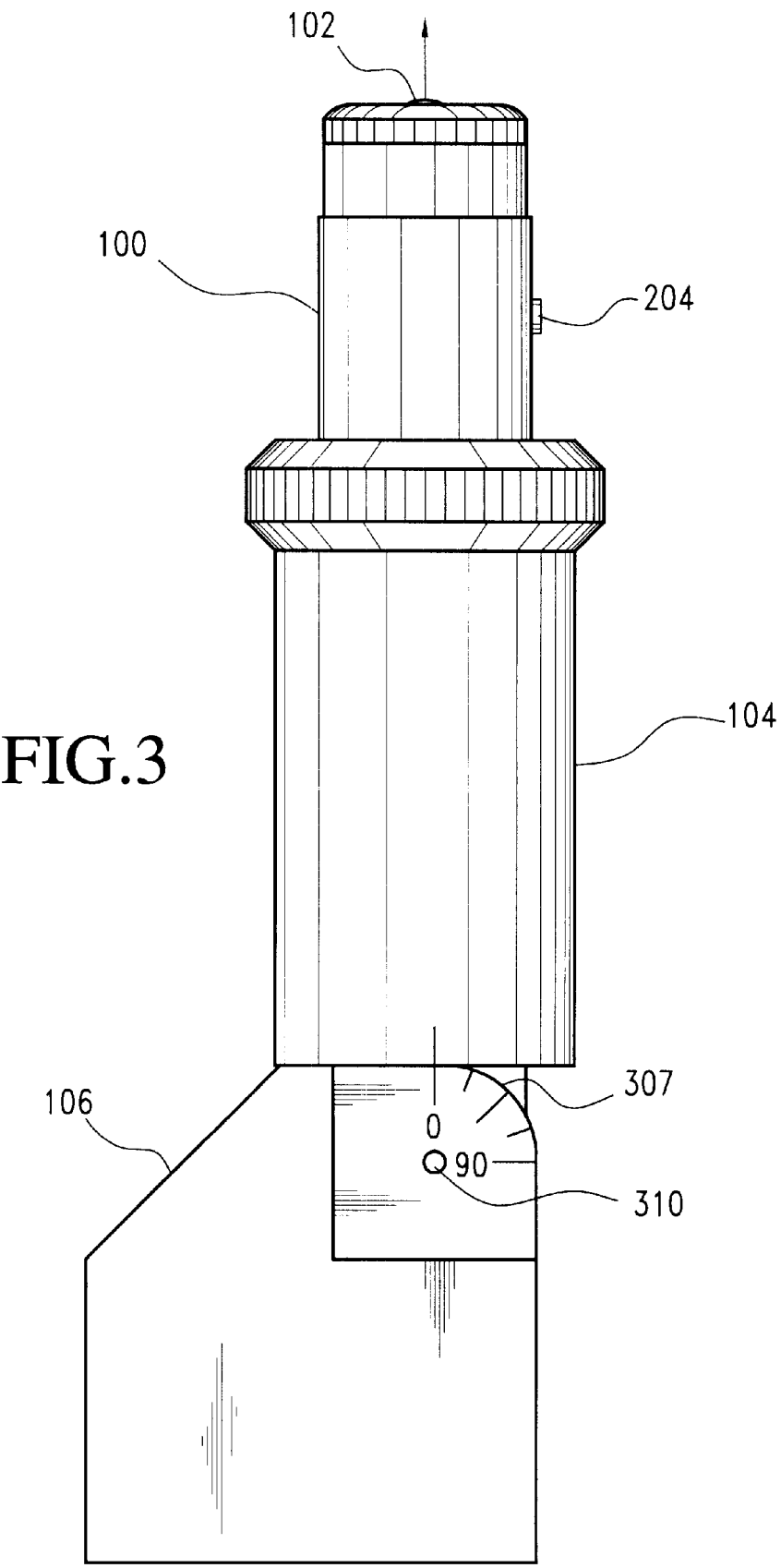
FIG. 3 illustrates a right side view of the preferred embodiment of the laser tool.

FIG. 2 illustrates a back view of the laser tool. Provided on laser 200 is an indicator 204, preferably a light source, used to inform the user of the emission of a laser beam from 202. Also shown is threaded aluminum swivel 208 (threads not shown) connecting sleeve 206 and base 210. The threaded swivel is connected by pin 310 (FIG. 3). Because of the method of assembly, the sleeve 206 which is rotated, holds in place because of the friction fit. Holes 212 are present due to injection molding.

Figure 4:
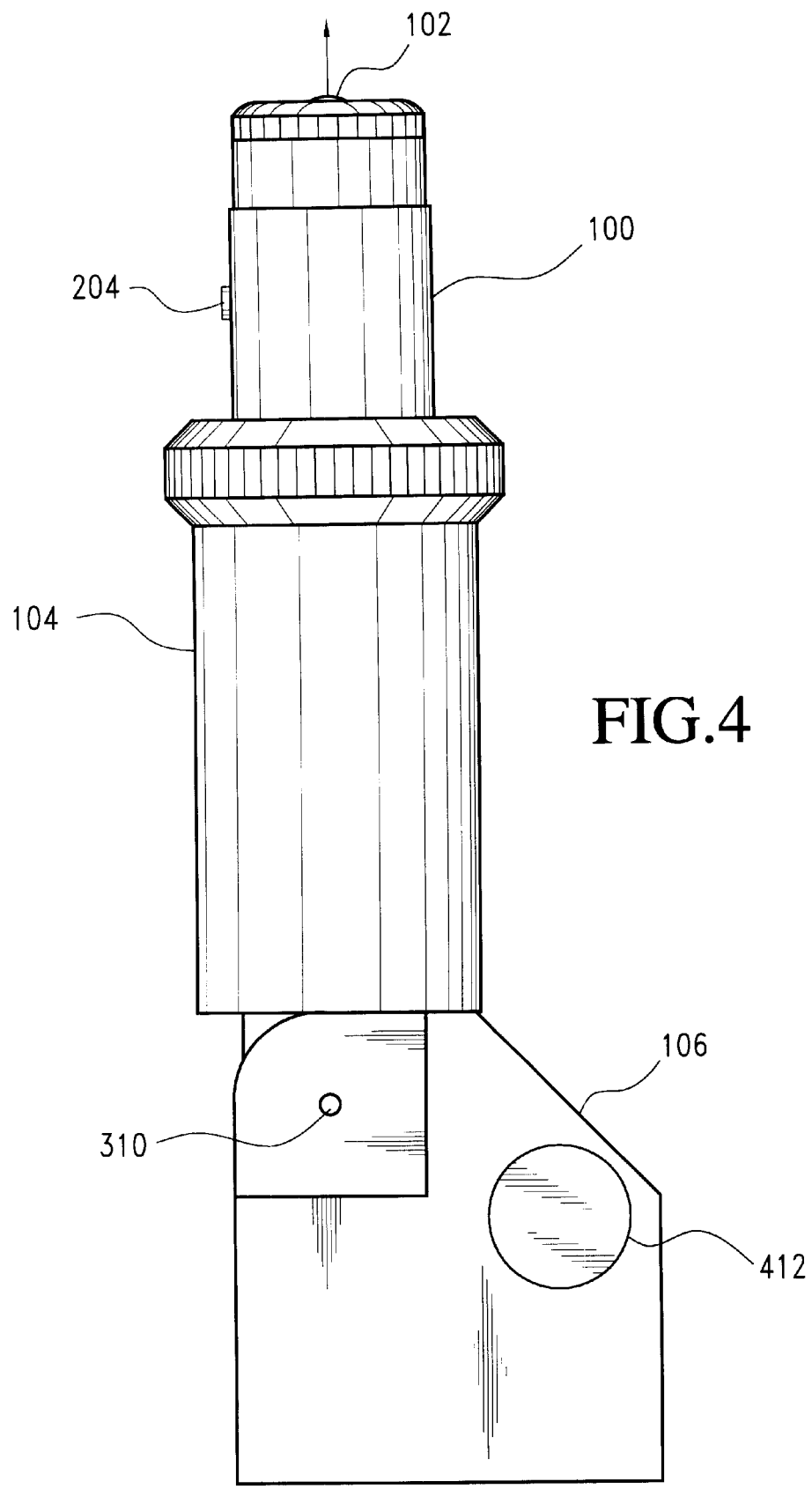
FIG. 4 illustrates a left side view of the preferred embodiment of the laser tool.

Side views of the laser tool are provided in FIGS. 3 and 4. FIG. 3 again illustrates laser 100 with indicator 204 for operation of laser beam 102 fit into sleeve 104. A stainless steel dowel pin 310 connects sleeve 104 and base 106. This pin is also depicted in FIG. 4. Pin 310 is inserted through the base 106 and the previously mentioned aluminum swivel 208. This allows the sleeve to move in an angled direction, preferably a range of 0 to 90 degrees (scale 307). The left view of FIG. 4 illustrates a similar connection of sleeve 104 to base 106 by pin 310. Here, however, hole 412 is shown for press fit of bubble level 108.

Figure 5:
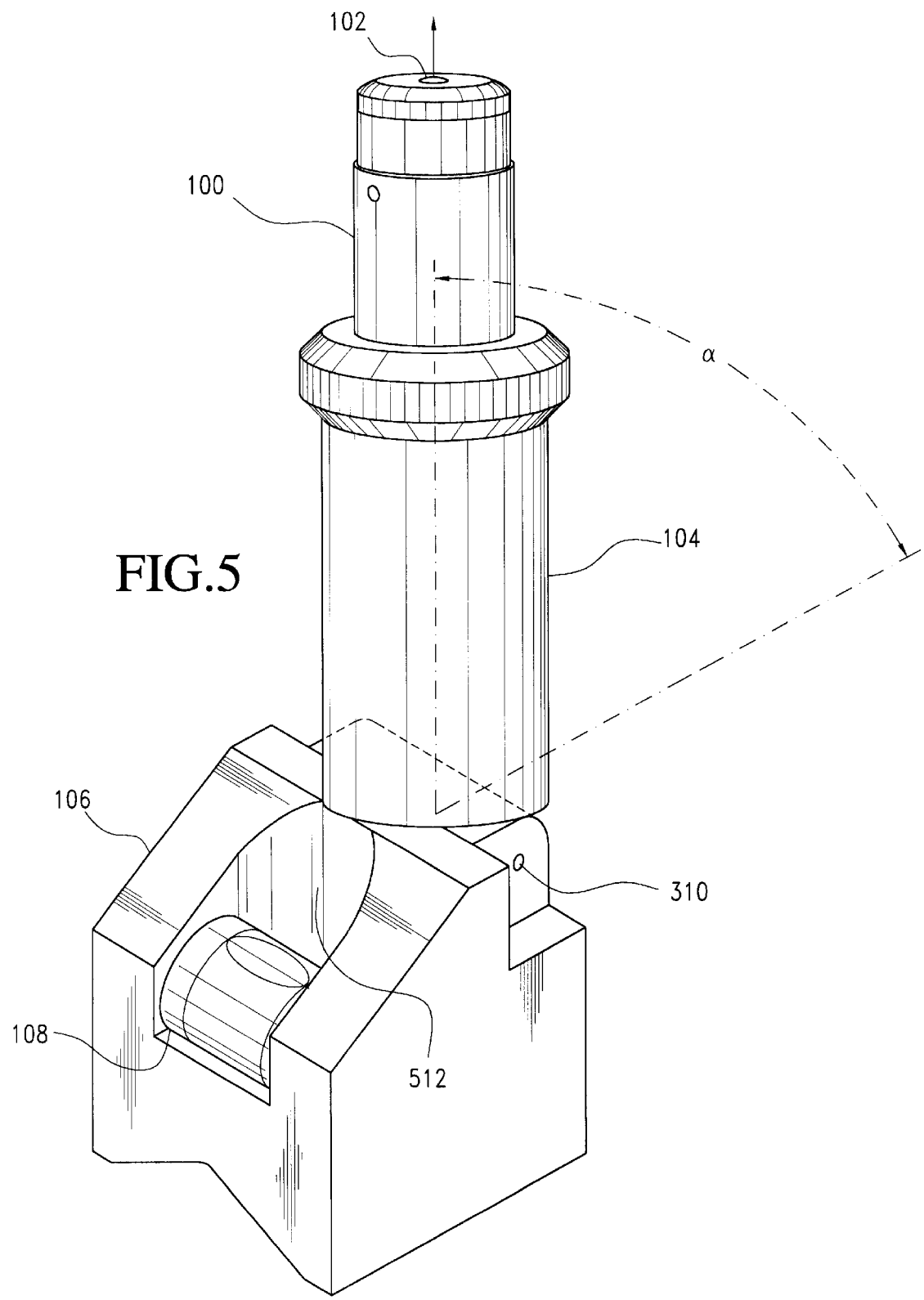
FIG. 5 illustrates a three-dimensional view of the preferred embodiment of the laser tool.

Provided in FIG. 5 is a 3-D view of the preferred embodiment of the present invention. Laser 100 with beam 102 is fit to sleeve 104. Again, it can be seen that pin 310 secures the connection of the aluminum threaded swivel (not shown) of sleeve 104 to angled base 106. Bubble level 108 is press fit to base.

Figure 6:
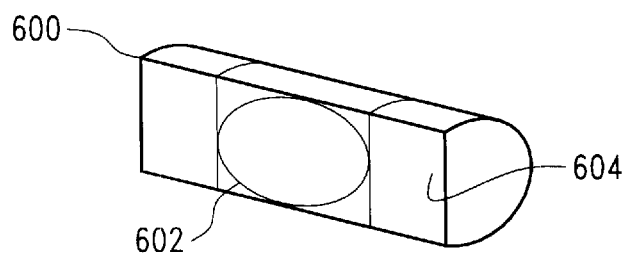
FIG. 6 illustrates a bubble level to be used for the preferred embodiment of the laser tool.

FIG. 6 illustrates a detail of bubble level 108. A typical level 600 utilizes an air bubble 602 to determine level measurement. By making liquid 604 illuminated, one would have a further advantage, insuring greater accuracy. As an alternative, the area behind the level, as depicted in FIG. 5 as 512, is painted with an iridescent paint that will allow the bubble to be seen more easily.

Figure 7:
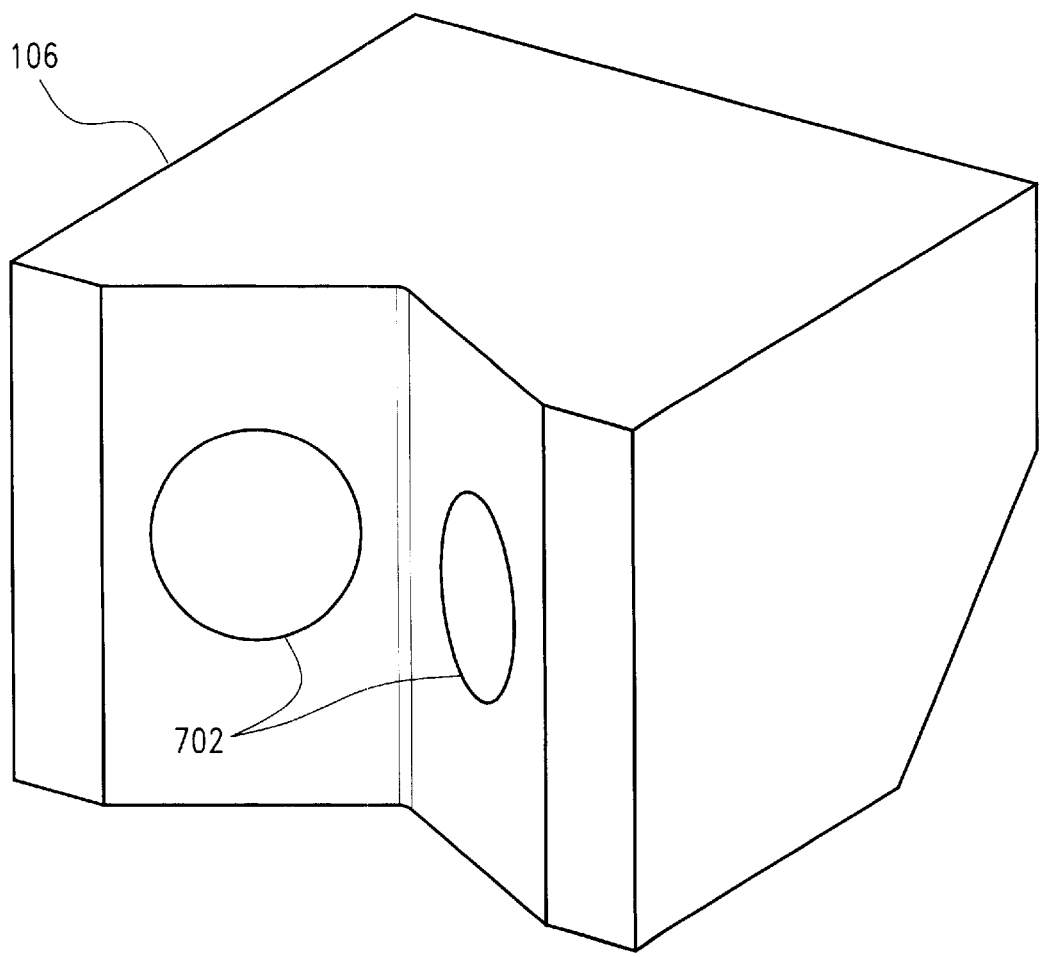
FIG. 7 illustrates a bottom view of preferred embodiment of the base of the laser tool.

FIG. 7 illustrates a detail of the base 106 as provided throughout the drawings. Illustrated is a bottom view of angled base. Preferably, ½ inch rare earth magnets 702 are provided to steady the level on a pipe. Angled base 106 allows the level to be placed conveniently on any size pipe or on a planar metal surface.

Figure 8:
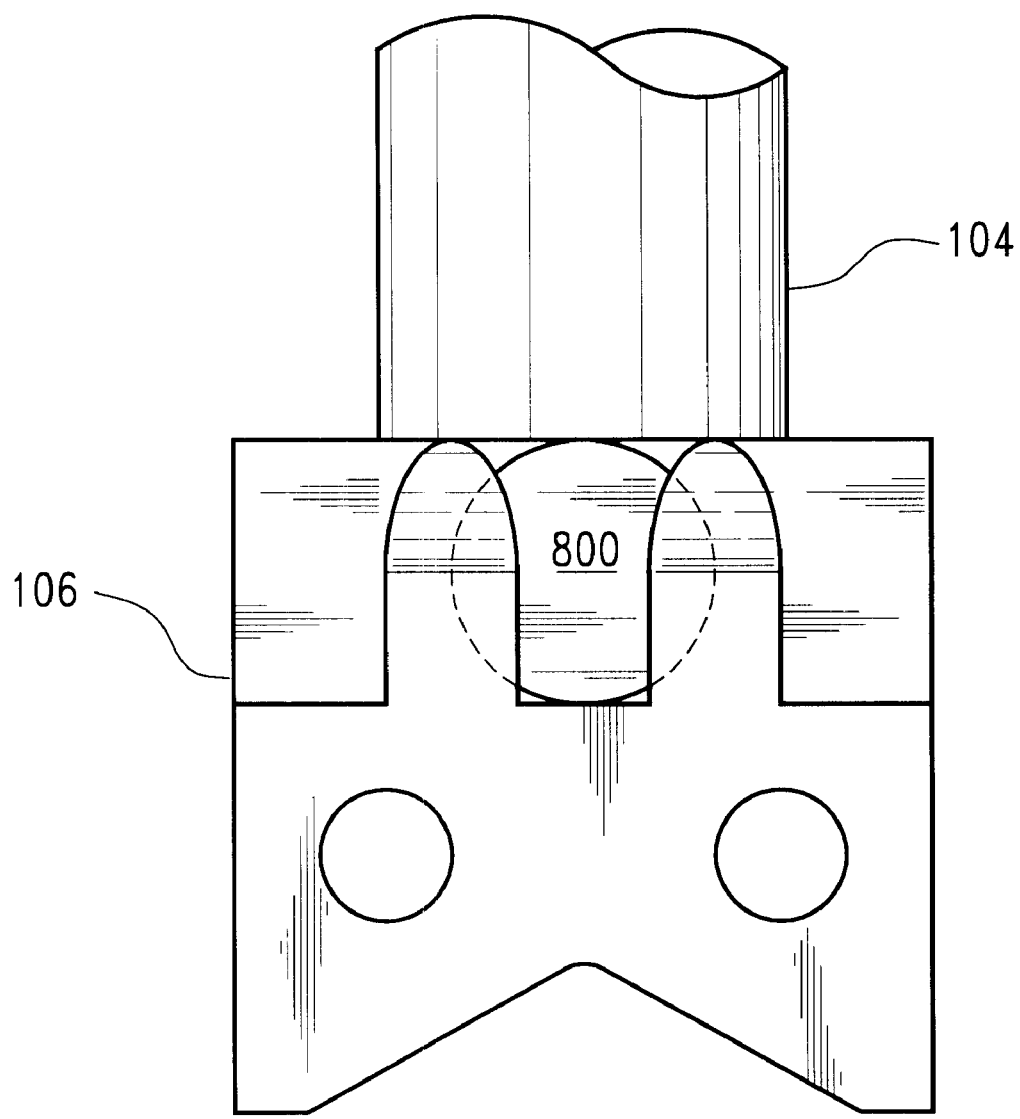
FIG. 8 illustrates a back view of an alternative embodiment of the laser tool.

An alternative embodiment for the above laser tool includes providing a ball valve in place of the threaded aluminum swivel. By providing a ball valve, the laser and sleeve will be able to move both in multiple directions. FIG. 8 illustrates a back view of ball joint 800 connecting sleeve 104 and base 106.

Referring to FIG. 5, in use, the base is secured by the magnets to a round pipe or other metal surface. A relative position to level (as determined by observation of the level 108) is determined. Laser 100 is turned on by rotation of cylinder 104 into an "on" position. The upper section, comprising parts 100–104 is rotated by a desired angle α to locate and accurately pinpoint a distant location to drill a hole into a support surface or parallel pipe/conduit.

Alternatively, the laser beam can be used for a distant reference point relative to a distant tape measure or to place a bend or angle in a pipe or conduit to meet appropriately with a needed connection, such as to a distant transformer. The extremely small size of the device (in the preferred embodiment, approximately 4 inches in length and less than 3 ounces), in concert with the powerful laser, versatile base and swivel, level, laser on/off and other features provide for benefits not provided in the prior art.

CONCLUSION

A system and method has been shown in the above embodiments for the effective implementation of a laser leveler. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the invention should not be limited by manufacturing techniques, laser specifications, materials, or connection methods.

What is claimed is:

1. A pocket-sized laser leveler tool, said tool used to align and locate points for attachment of hangers or supports of pipes or conduits comprising:
   a magnetic base for attachment to a metalized surface, said magnetic base comprising a single piece molded structure, magnets and a level retained within said base,
   a laser pointer, said laser pointer emitting a laser beam;
   a rotating sleeve, said rotating sleeve encapsulating said laser pointer and connected to said base by a swivel connector, said swivel connector received and secured laterally by press fit and vertically by pin in a swivel receiving channel within said molded structure and wherein said sleeve is adjustable from a vertical axis substantially 0–90 degrees as limited by a physical stop of said swivel with an upper and lower limit of said swivel receiving channel.

2. A pocket-sized laser leveler tool, said tool used to align and locate points for attachment of hangers or supports of pipes or conduits, as per claim 1, wherein said base is made of ABS injection molded plastic.

3. A pocket-sized laser leveler tool, said tool used to align and locate points for attachment of hangers or supports of pipes or conduits, as per claim 1, wherein said sleeve further comprises an indicator for indicating an on/off status.

4. A pocket-sized laser leveler tool, said tool used to align and locate points for attachment of hangers or supports of pipes or conduits, as per claim 1, wherein said laser pointer sleeve is made of ABS injection molded plastic.

5. A pocket-sized laser leveler tool, said tool used to align and locate points for attachment of hangers or supports of pipes or conduits, as per claim 1, wherein said laser pointer sleeve is rotatable around said pointer to turn said laser beam on or off.

6. A pocket-sized laser leveler tool, said tool used to align and locate points for attachment of hangers or supports of pipes or conduits, as per claim 1, wherein said base contains a medium behind the location of the bubble level that illuminates said bubble level.

7. A pocket-sized laser leveler tool, said tool used to align and locate points for attachment of hangers or supports of pipes or conduits, as per claim 1, wherein said base contains scale indicators for indicating the degree at which said laser pointer is angled relative to the vertical axis.

8. A pocket-sized laser leveler tool, said tool used to align and locate points for attachment of hangers or supports of pipes or conduits, as per claim 1, wherein said tool is less than 6 inches in length.

9. A pocket-sized laser leveler tool, said tool used to align and locate points for attachment of hangers or supports of pipes or conduits, as per claim 1, wherein said tool weighs less than 6 ounces.

10. A pocket-sized laser leveler tool, said tool, as per claim 1, wherein said laser is centered by one or more set screws.

11. A miniature laser pointer tool used to align and locate points for attachment of hangers or supports of pipes or conduits, said tool comprising:
    a single-piece molded ABS plastic base with angled feet, said base retaining a laser assembly comprising: laser, encapsulating sleeve and connector attached to said sleeve, said connector retained laterally by press fit and vertically by pin in an external vertical receiving channel located within said single-piece molded ABS plastic base;

level and magnets retained within said base, and said miniature laser pointer tool small enough to be received within a pocket.

12. A miniature laser pointer tool used to align and locate points for attachment of hangers or supports of pipes or conduits, as per claim 11, wherein said tool is less than 6 inches in length.

13. A miniature laser pointer tool used to align and locate points for attachment of hangers or supports of pipes or conduits, as per claim 11, wherein said tool weighs less than 6 ounces.

* * * * *

UNITED STATES PATENT AND TRADEMARK OFFICE
CERTIFICATE OF CORRECTION

PATENT NO. : 6,532,676 B2
DATED : March 18, 2003
INVENTOR(S) : Christopher L. Cunningham It is certified that error appears in the above-identified patent and that said Letters Patent is hereby corrected as shown below:

Column 1,
Line 47, after "this problem by" delete "loft".

Column 2,
Line 63, after "connected" delete "press to base are fit" insert therefore -- to base are press fit --.
Line 66, after "laser" delete "200" insert therefore -- 100 --.

Column 3,
Line 1, delete "202" insert therefore -- 102 --.
Lines 2 and 4, after "sleeve" delete "206" insert therefore -- 104 --.
Line 2, after "base" delete "210" insert therefore -- 106 --.

Signed and Sealed this

Twenty-fifth Day of November, 2003

JAMES E. ROGAN
*Director of the United States Patent and Trademark Office*